Patented Feb. 9, 1954

2,668,831

UNITED STATES PATENT OFFICE 2,668,831

O-ETHYL S-(ETHYLXANTHOYL) N,N-DI-ETHYLAMIDOTHIOPHOSPHATE

Henry Tolkmith, Midland, Mich., assignor to The Dow Chemical Company, Midland, Mich., a corporation of Delaware No Drawing. Application April 21, 1953,
Serial No. 350,244

1 Claim. (Cl. 260—455)

This invention is directed to the O-ethyl S-(ethylxanthoyl) N,N-diethylamidothiophosphate of the formula

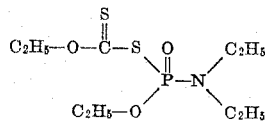

This compound is a viscous oil, somewhat soluble in many organic solvents and substantially insoluble in water. It is of value as an intermediate for the preparation of more complex organic derivatives and as a toxic constituent of parasiticide compositions.

This new compound may be prepared by reacting an alkali metal ethylate with S-(ethylxanthoyl) N,N-diethylamidothiophosphoric chloride of the formula

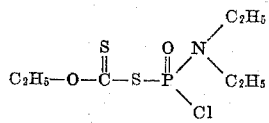

in an inert organic solvent such as benzene. Of the alkali metal ethylates found useful in the reaction, it is preferred to employ the sodium compound. In practice, good results are obtained when substantially equimolecular proportions of the reactants are employed.

In carrying out the reaction, the sodium ethylate is added with stirring to the S-(ethylxanthoyl) N,N-diethylamidothiophosphoric chloride dispersed in the solvent and the resulting mixture heated for a period of time at a temperature of from 40° to 80° C. Temperatures substantially in excess of 80° C. for any appreciable period of time are to be avoided, as the desired product has a tendency to decompose at such temperature. If desired, an alcoholic solution of the ethylate may be employed as a starting material. It has been found that the excess alcohol does not interfere with the course of the reaction. Upon completion of the reaction, the mixture may be filtered and the filtrate concentrated by distillation under reduced pressure at gradually increasing temperatures up to a temperature of 80° C. to separate low boiling constituents and to obtain as a residue the desired product.

The S-(ethylxanthoyl) N,N-diethylamidothiophosphoric chloride employed as a starting material in the above-described method may be prepared by reacting one molecular proportion of sodium ethylxanthate with one molecular proportion of diethylamidophosphoric dichloride in an inert organic solvent such as benzene. In carrying out the reaction, the reactants and solvent are mixed together and the resulting dispersion heated for a period of time at a temperature of from 40° to 80° C. Upon completion of the reaction, the mixture may be filtered and the filtrate concentrated by distillation under reduced pressure to a temperature up to 80° C. to obtain as a residue S-(ethylxanthoyl) N,N-diethylamidothiophosphoric chloride. This compound is an oily liquid having a density of 1.195 at 18° C. The latter compound and the described method for its production constitute the subject matter of my application Serial No. 203,767, filed December 30, 1950.

In a representative preparation an alcoholic solution of 6.8 grams (0.1 mole) of sodium ethylate in 32 milliliters of ethanol was added with stirring to 27.5 grams (0.1 mole) of S-(ethylxanthoyl) N,N - diethylamidothiophosphoric chloride dissolved in 125 milliliters of benzene and the resulting mixture heated for 2 hours at the boiling temperature and under reflux. The crude reaction mixture was then filtered and the filtrate concentrated by distillation under reduced pressure at gradually increasing temperatures up to 80° C. to obtain as a residue an O-ethyl S-(ethylxanthoyl) N,N-diethylamidothiophosphate product. The latter is a viscous oil having a density of 1.054 at 20° C.

The new O-ethyl S-(ethylxanthoyl) N,N-diethylamidothiophosphate product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture. In representative operations against 2-spotted spider mites, 100 percent kills of this organism are obtained with aqueous spray compositions containing 1.5 pounds of the toxic thiophosphate per 100 gallons of spray mixture.

This is a continuation in part of my copending application Serial No. 203,775, filed December 30, 1950.

I claim:

O-ethyl S-(ethylxanthoyl) N,N-diethylamidothiophosphate.

HENRY TOLKMITH.

No references cited.